US012596576B2

(12) United States Patent (10) Patent No.: US 12,596,576 B2
Kutch et al. (45) Date of Patent: Apr. 7, 2026

(54) TECHNIQUES TO EXPOSE APPLICATION TELEMETRY IN A VIRTUALIZED EXECUTION ENVIRONMENT

(71) Applicant: Intel Corporation, Santa Clara, CA (US)

(72) Inventors: Patrick G. Kutch, Tigard, OR (US); Francesc Guim Bernat, Barcelona (ES); Andrey Chilikin, Limerick (IE); Brian P. Johnson, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 780 days.

(21) Appl. No.: 17/709,289

(22) Filed: Mar. 30, 2022

(65) Prior Publication Data

US 2022/0222117 A1      Jul. 14, 2022

(51) Int. Cl.
    *G06F 9/46*        (2006.01)
    *G06F 9/50*        (2006.01)

(52) U.S. Cl.
    CPC .......... *G06F 9/5016* (2013.01); *G06F 9/5077* (2013.01); *G06F 2209/501* (2013.01); *G06F 2209/508* (2013.01)

(58) Field of Classification Search
    CPC ................. G06F 9/5016; G06F 9/5077; G06F 2209/501; G06F 2209/508
    See application file for complete search history.

(56) References Cited

U.S. PATENT DOCUMENTS

| | | | | |
|---|---|---|---|---|
| 2007/0300231 A1* | 12/2007 | Aguilar | ................. | G06F 9/4881 |
| | | | | 718/104 |
| 2017/0288971 A1* | 10/2017 | Jayaraman | .......... | H04L 12/4641 |
| 2020/0348973 A1* | 11/2020 | Kutch | ..................... | H04L 43/20 |
| 2021/0357156 A1* | 11/2021 | Beale et al. | ........ | H04L 43/0876 |

OTHER PUBLICATIONS

"Intel Cache Allocation Technology and Code and Data Prioritization Features", Revision 1.17, https://xenbits.xenproject.org/docs/unstable/features/intel_psr_cat_cdp.html, Jul. 10, 2018, 10 pages.
Intel, "Intel® 64 and IA-32 Architectures Software Developer's Manual", vol. 3B: System Programming Guide, Part 2, Sep. 2016, 582 pages.
Intel, "Intel® Scalable I/O Virtualization", Technical Specification, Rev 1.1, Sep. 2020, 29 pages.
Intel, "Intel® Speed Select Technology (Intel® SST)", White paper by Intel and phoenixNAP, Feb. 2020, 5 pages.
Su, Tony, et al., "An Out-of-Band Method to Harness Intel® Resource Director Technology Power in Virtualization Environment", https://01.org/blogs/tsu5/2020/out-band-method-harness-intel%C2%AE-resource-director-technology-power-virtualization, Feb. 26, 2020, 18 pages.

* cited by examiner

*Primary Examiner* — Diem K Cao
(74) *Attorney, Agent, or Firm* — Compass IP Law PC

(57) ABSTRACT

Examples describe techniques to expose application telemetry in a virtualized execution environment. Examples include a plurality of application executing within the virtualized execution environment writing telemetry data to a memory associated with virtual devices of a hardware device. Examples also include an orchestrator to read the telemetry data from the memory and use the telemetry data to make resource allocation decisions.

21 Claims, 7 Drawing Sheets

FLOW 500

System 200

*FIG. 2*

Scheme 300

Process 400

FLOW <u>500</u>

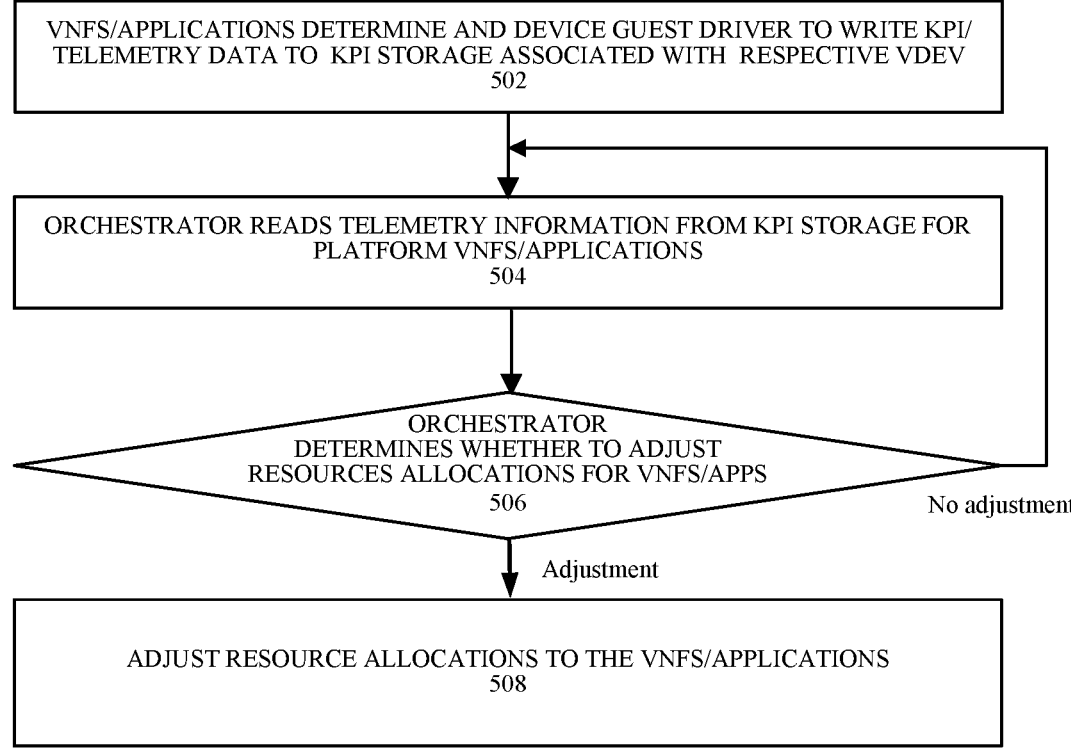

VNFS/APPLICATIONS DETERMINE AND DEVICE GUEST DRIVER TO WRITE KPI/
TELEMETRY DATA TO KPI STORAGE ASSOCIATED WITH RESPECTIVE VDEV
502

ORCHESTRATOR READS TELEMETRY INFORMATION FROM KPI STORAGE FOR
PLATFORM VNFS/APPLICATIONS
504

ORCHESTRATOR
DETERMINES WHETHER TO ADJUST
RESOURCES ALLOCATIONS FOR VNFS/APPS
506

No adjustment

Adjustment

ADJUST RESOURCE ALLOCATIONS TO THE VNFS/APPLICATIONS
508

TECHNIQUES TO EXPOSE APPLICATION TELEMETRY IN A VIRTUALIZED EXECUTION ENVIRONMENT

Cloud computing and mobile device utilization has increased wired and wireless network utilization. In computing networks and data centers, central processing units (CPUs) may be configured to run various network processing operations to rapidly handle network processing of packets. Examples of network processing operations include, but are not limited to, 5G base stations, 5G User Plane Function (UPF) solutions, virtual Cable Modem Termination Systems (CMTS), virtual firewalls, routers, load balancers, hardware acceleration and more.

BRIEF DESCRIPTION OF THE DRAWINGS

FIG. 2 illustrates an example second system.
FIG. 5 illustrates an example flow.

DETAILED DESCRIPTION

Figure 1:
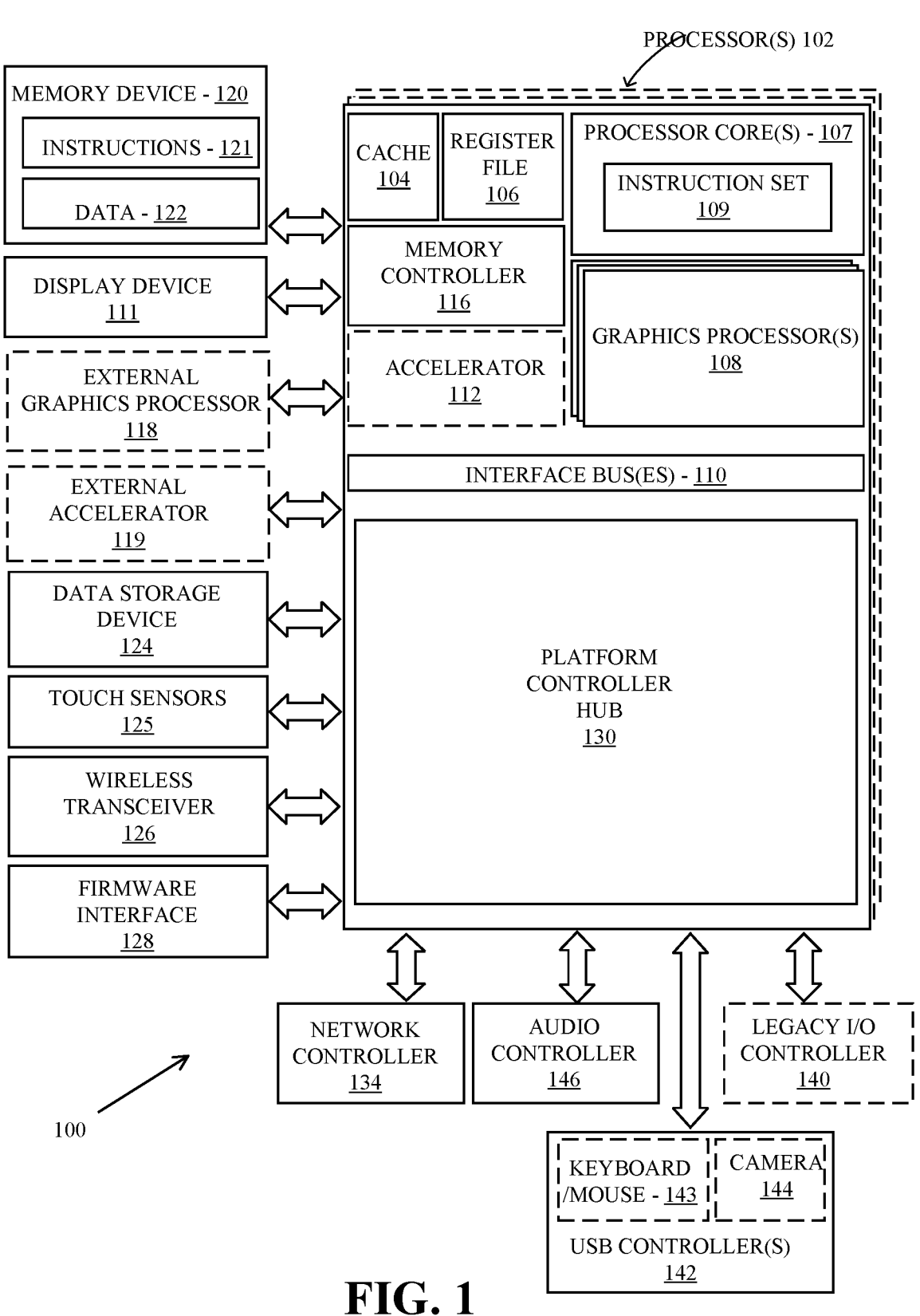
FIG. 1 illustrates an example first system.

A rapid adoption of Network Function Virtualization (NFV) is occurring. A key component of the NFV is a virtual network function (VNF). VNFs may range from traditional VNFs such as routers, load balancers and firewalls to more modern 5G infrastructure and other types of communication-related VNFs (e.g., virtualized cable model termination systems (vCMTS). In an example of VNFs to be used for network protocol processing, software executes in a virtualized environment such as a virtual machine or a container. Currently, reporting operating health of the network protocol processing software is performed using custom-made software. For example, virtualized environments can report operating health of the network protocol processing software to an orchestrator using a custom-made software socket for network-based communication with the orchestrator. For example, InfluxDB, Grafana, Graphite, or Prometheus monitoring and time series database software can be used to report operating health such as "healthy" or "not healthy." The orchestrator can increase platform resources allocated to the virtual environment based on the operating health being not healthy or maintain or decrease platform resources allocated to the virtual environment based on the operating health being healthy. Reporting operating health using a network connection socket may lead to reporting operating health information and responding to operating health information too slowly because sending operating health telemetry over a network incurs network traversal-related latency. For example, data provided by a virtual environment over a socket to an orchestrator can incur a delay time of 2-3 seconds until the orchestrator is able to retrieve the operating health telemetry data from when the operating health telemetry data was available and this amount of delay can be unacceptable. By the time the orchestrator adjusts platform resources made available to the virtual environment, the operating heath of the virtual environment may have changed and the allocated resources may no longer fit the current operating conditions.

In some cases, multiple VNFs/applications may include software executing on a platform that supports one or more central processing units (CPUs). Each CPU (e.g., deployed in separate sockets) may have multiple cores. Each VNF/application may be allocated a highest expected resource use of a CPU's or core's operating frequency as well as cache allocation, memory allocation, and network interface allocation to handle a worst case scenario workload and avoid violating respective terms of service such as service level agreement (SLA) requirements for each of the VNFs/applications. For example, CPU/core utilization can be set at 100% for processes compatible with Data Plane Development Kit (DPDK) or Storage Performance Development Kit (SPDK) applications that are executing within a virtual environment, even if there are no packets or data to process. For this example, there may be no way to know if a change can be made to a CPU/core utilization for these types of VNF/applications without adversely affecting performance. In another example, a first VNF/application could operate such that a relatively large amount of fragmented CPU/core cache occurs. For this other example, reducing the cache allocated to second VNF/application to give to the first VNF/application would likely gain no benefits. These two examples describe how there is a problem with a lack of a reliable method to know when and how to use various resource monitoring technologies such as types of CPU frequency or cache resource monitoring for running a VNF/application in a multiple VNF/application per platform environment. It is with respect to these challenges that the examples described below are needed.

FIG. 1 illustrates an example system 100. System 100 may be used in a single processor desktop system, a multiprocessor workstation system, a server system having a large number of processor(s) 102 or processor cores 107, any rack, row, edge network, or data center. In some embodiments, the system 100 is a processing platform incorporated within a system-on-a-chip (SoC) integrated circuit for use in mobile, handheld, or embedded devices such as within Internet-of-things (IoT) devices with wired or wireless connectivity to a local or wide area network.

According to some examples, system 100 can include, couple with, or be integrated within: a server-based gaming platform; a game console, including a game and media console; a mobile gaming console, a handheld game console, or an online game console. In some examples, the system 100 is part of a mobile phone, smart phone, tablet computing device or mobile Internet-connected device such as a laptop with low internal storage capacity. Processing system 100 can also include, couple with, or be integrated within: a wearable device, such as a smart watch wearable device; smart eyewear or clothing enhanced with augmented reality (AR) or virtual reality (VR) features to provide visual, audio or tactile outputs to supplement real world visual, audio or tactile experiences or otherwise provide text, audio, graphics, video, holographic images or video, or tactile feedback; other augmented reality (AR) device; or other virtual reality (VR) device. In some embodiments, the processing system 100 includes or is part of a television or set top box device. In some examples, system 100 can include, couple with, or be integrated within a self-driving vehicle such as a bus, tractor trailer, car, motor or electric power cycle, plane or glider (or any combination thereof). The self-driving vehicle may use system 100 to process the environment sensed around the vehicle.

In some examples, processor(s) 102 each include one or more processor core(s) 107 to process instructions which, when executed, perform operations for system or user software. In some embodiments, at least one of processor core(s) 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Processor core(s) 107 may process a different instruction set 109, which may include instructions to facilitate the emulation of other instruction sets. Processor core 107 may also include other processing devices, such as a Digital Signal Processor (DSP).

According to some examples, processor(s) 102 include a cache memory 104. Cache memory 104 may include a Level-0, a Level-1 or a Level-2 cache. Depending on the architecture, processor(s) 102 may have a single internal cache or multiple levels of internal cache. In some examples, the cache memory is shared among various components of processor(s) 102. Processor(s) 102 may also use an external cache (e.g., a Level-3 (L3) cache or Last Level Cache (LLC)) (not shown), which may be shared among processor core(s) 107 using known cache coherency techniques. A register file 106 may be additionally included in processor(s) 102 and may include different types of registers for storing different types of data (e.g., integer registers, floating point registers, status registers, and an instruction pointer register). Some registers may be general-purpose registers, while other registers may be specific to the design of processor(s) 102. In some examples, registers may include register banks.

In some examples, register file 106 can include model specific registers (MSR). For example, model specific register (MSR) and/or register file 106 can include control registers used for program execution tracing, toggling of compute features, and/or performance monitoring. The MSR can include one or more of: memory order buffer (MOB) control and status; page fault error codes; clearing of page directory cache and translation lookaside buffer (TLB) entries; control of the various cache memories in the cache hierarchy of the microprocessor, such as disabling portions or all of a cache, removing power from portions or all of a cache, and invalidating cache tags; microcode patch mechanism control; debug control; processor bus control; hardware data and instruction pre-fetch control; power management control, such as sleep and wakeup control, state transitions as defined by Advanced Configuration and Power Interface (ACPI) industry standards (e.g., P-states and C-states), and disabling clocks or power to various functional blocks; control and status of instruction merging; Error-correcting code (ECC) memory error status; bus parity error status; thermal management control and status; service processor control and status; inter-core communication; inter-die communication; functions related to fuses of the microprocessor; voltage regulator module voltage identifier control; phase lock loop (PLL) control; cache snoop control; write-combine buffer control and status; overclocking feature control; interrupt controller control and status; temperature sensor control and status; enabling and disabling of various features, such as encryption/decryption, MSR password protection, making parallel requests to the L2 cache and the processor bus, individual branch prediction features, instruction merging, microinstruction timeout, performance counters, store forwarding, and speculative table walks; load queue size; cache memory size; control of how accesses to undefined MSRs are handled; multi-core configuration; configuration of a cache memory (e.g., de-selecting a column of bit cells in a cache and replacing the column with a redundant column of bit cells), duty cycle and/or clock ratio of phase-locked loops (PLLs) of the microprocessor, and the setting voltage identifier (VID) pins that control a voltage source to the microprocessor.

According to some examples, processor(s) 102 may be coupled with one or more interface bus(es) 110 to transmit communication signals such as address, data, or control signals between processor 102 and other components in the system 100. The interface bus 110, in some embodiments, may be a processor bus, such as a version of the Direct Media Interface (DMI) bus. However, processor busses are not limited to the DMI bus, and may include one or more Peripheral Component Interconnect buses (e.g., PCI, PCI express), memory busses, or other types of interface busses. In some examples, processor(s) 102 include an integrated memory controller 116 and a platform controller hub 130. For these examples, memory controller 116 facilitates communication between a memory device and other components of the system 100, while platform controller hub (PCH) 130 provides connections to I/O devices via a local I/O bus.

In some examples, memory device 120 may be a dynamic random-access memory (DRAM) device, a static random-access memory (SRAM) device, flash memory device, phase-change memory device, or some other memory device having suitable performance to serve as process or system memory. In some examples, memory device 120 may operate as system memory for system 100, to store data 122 and instructions 121 for use when processor(s) 102 executes an application or process (e.g., a VNF). Memory controller 116 also couples with an optional external graphics processor 118, which may communicate with the one or more graphics processors 108 in processor(s) 102 to perform graphics and media operations. In some examples, graphics, media, and or compute operations may be assisted by an accelerator 112 which is a coprocessor that can be configured to perform a specialized set of graphics, media, or compute operations. For example, accelerator 112 is a matrix multiplication accelerator used to optimize machine learning or compute operations or accelerator 112 may assist processor(s) with security, authentication and compression for cloud, networking or storage applications. In some examples, accelerator 112 includes a ray-tracing accelerator that can be used to perform ray-tracing operations in concert with the graphics processor 108. In some embodiments, an external accelerator 119 may be used in place of or in concert with the accelerator 112.

According to some examples, external accelerator 119 may include an infrastructure processing unit (IPU) or data processing unit (DPU) or may be utilized by an IPU or DPU. An xPU may refer at least to an IPU, DPU, graphic processing unit (GPU), general-purpose GPU (GPGPU). An IPU or DPU may include a network interface with one or more programmable or fixed function processors to perform offload of operations that could have been performed by a CPU (e.g., processor(s) 102). The IPU or DPU may include one or more memory devices (not shown). In some examples, the IPU or DPU may perform virtual switch operations, manage storage transactions (e.g., compression, cryptography, virtualization), and manage operations performed on other IPUs, DPUs, servers, or devices.

According to some examples, a display device 111 may connect to processor(s) 102. Display device 111 may be one or more of an internal display device, as in a mobile electronic device or a laptop device or an external display device attached via a display interface (e.g., DisplayPort, embedded DisplayPort, MIPI, HDMI, etc.). In some examples, display device 111 may be a head mounted display (HMD) such as a stereoscopic display device for use in virtual reality (VR) applications or augmented reality (AR) applications.

In some examples, platform controller hub 130 enables peripherals to connect to memory device 120 and processor(s) 102 via a high-speed I/O bus. The I/O peripherals include, but are not limited to, an audio controller 146, a network controller 134, a firmware interface 128, a wireless transceiver 126, touch sensors 125, a data storage device 124 (e.g., non-volatile memory, volatile memory, hard disk drive, flash memory, NAND, 3D NAND, 3D XPoint, etc.). Data storage device 124 may connect via a storage interface (e.g., SATA) or via a peripheral bus, such as a Peripheral Component Interconnect bus (e.g., PCI, PCI express). Touch sensors 125 can include touch screen sensors, pressure sensors, or fingerprint sensors. Wireless transceiver 126 may be a Wi-Fi transceiver, a Bluetooth transceiver, or a mobile network transceiver such as a 3G, 4G, 5G, or Long-Term Evolution (LTE) transceiver. Firmware interface 128 enables communication with system firmware, and may be, for example, a unified extensible firmware interface (UEFI). Network controller 134 can enable a network connection to a wired network. In some embodiments, a high-performance network controller (not shown) couples with the interface bus 110. Audio controller 146, in some examples, is a multi-channel high definition audio controller. In some examples, system 100 includes an optional legacy I/O controller 140 for coupling legacy (e.g., Personal System 2 (PS/2)) devices to system 100. Platform controller hub 130 may also connect to one or more Universal Serial Bus (USB) controllers 142 to connect input devices, such as keyboard and mouse 143 combinations, a camera 144, or other USB input devices.

It will be appreciated that the system 100 shown is exemplary and not limiting, as other types of data processing systems that are differently configured may also be used. For example, an instance of memory controller 116 and platform controller hub 130 may be integrated into a discreet external graphics processor, such as external graphics processor 118. In some examples, platform controller hub 130 and/or memory controller 116 may be external to processor(s) 102. For example, system 100 may include an external memory controller 116 and platform controller hub 130, which may be configured as a memory controller hub and peripheral controller hub within a system chipset that is in communication with processor(s) 102.

According to some examples, circuit boards ("sleds") can be used on which components such as CPUs, memory, and other components are placed are designed for increased thermal performance. In some examples, processing components such as processor(s) 102 are located on a top side of a sled while near memory, such as dual in-line memory modules (DIMMs), are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in a rack, thereby enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other.

A data center can utilize a single network architecture ("fabric") that supports multiple other network architectures including Ethernet and Omni-Path. A plurality of sleds may be coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center may, in use, pool resources, such as memory, accelerators (e.g., GPUs, graphics accelerators, FPGAs, ASICs, neural network and/or artificial intelligence accelerators, etc.), and data storage drives that are physically disaggregated, and provide them to compute resources (e.g., processors) on an as needed basis, enabling the compute resources to access the pooled resources as if they were local.

A power supply or source can provide voltage and/or current to system 100 or any component or system described herein. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

Any processor or core can execute a virtualized execution environment (VEE). A VEE may include at least a virtual machine or a container. VEEs can execute in bare metal (e.g., single tenant) or hosted (e.g., multiple tenants) environments. A virtual machine (VM) may be software that runs a guest OS and one or more applications. A VM may be defined by specification, configuration files, virtual disk file, non-volatile random access memory (NVRAM) setting file, and the log file and is backed by the physical resources of a host computing platform. A VM may be an OS or application environment that is installed on software, which imitates dedicated hardware. The end user has the same experience on a virtual machine as they would have on dedicated hardware. Specialized software, called a hypervisor or virtual machine manager (VMM), emulates the PC client or server's CPU, memory, hard disk, network and other hardware resources completely, enabling virtual machines to share the resources. The hypervisor or VMM may emulate multiple virtual hardware platforms that are isolated from each other, allowing virtual machines to run Linux®, FreeBSD, VMWare, or Windows® Server operating systems on the same underlying physical host or platform.

A container may be a software package of applications, configurations and dependencies so the applications run reliably on one computing environment to another. Containers may share an OS installed on a server platform and run as isolated processes. A container may be a software package that contains everything the software needs to run such as system tools, libraries, and settings. Containers are not installed like traditional software programs, which allows them to be isolated from the other software and the operating system itself. Isolation can include permitted access of a region of addressable memory or storage by a particular container but not another container or permitted access via an assignable device interface (e.g., associated with Intel® Scalable I/O Virtualization). The isolated nature of containers provides several benefits. First, the software in a container will run the same in different environments. For example, a container that includes PHP and MySQL can run identically on both a Linux computer and a Windows® machine. Second, containers provide added security since the software will not affect the host operating system. While an installed application may alter system settings and modify resources, such as the Windows® registry, a container can only modify settings within the container.

A virtualized infrastructure manager (VIM), hypervisor or VMM (not shown in FIG. 1) may manage the life cycle of a VEE (e.g., creation, maintenance, and tear down of VEEs associated with one or more physical resources), track VEE instances, track performance, fault and security of VEE instances and associated physical resources, and expose VEE instances and associated physical resources to other management systems.

For example, an application, workload or software can execute within a VEE in a bare metal or multi-tenant environment. In some examples, the application, workload or software executes on one or more dedicated cores of a processor (e.g., processor(s) 102) to support a VNF. As described more below, the VNF/application exposes telemetry in a type of virtualized software architecture that includes the use of hardware virtualization such as described in the Intel® Scalable I/O Virtualization Architecture Specification, Rev. 1.1, published in September of 2020 (herein after "the S-IOV" specification). The hardware virtualization, for example, may be for a hardware device such as an Ethernet network controller or network interface card. The telemetry may be exposed by enabling the VNF/application to send telemetry data (e.g., key performance indicators (KPIs)) to a host or physical function (PF) driver for a virtualized Ethernet network controller. The host or PF driver may maintain the telemetry data/KPIs in a storage or memory space that is accessible by a user-space application such as a platform orchestrator. The user-space application (e.g., orchestrator) may read the telemetry data/KPIs and make decisions on if/how to change various resources used by the VNF/application in a multi VNF/application operating environment.

In some examples, one or more KPIs associated with a VNF/application and a core may be used by a service assurance agent (e.g., an orchestrator) to determine the VNF's/application's performance. The service assurance agent may be configured to recognize content that KPIs convey (e.g., dropped packets per time interval, busyness level, packet processing activity (e.g., packets processed per time interval), video frames processed per time interval and so forth). A mapping of telemetry data type or content to specific KPI may be conveyed via a description of the VNF/application (e.g., in attributes for a Kubernetes deployable unit (e.g., Pod)). The service assurance agent can pin certain VNF/applications to particular cores for execution and identify the type of corresponding telemetry information for the VNF/application based on metadata to be included with each KPI that uniquely identifies the VNF/application that sent a respective KPI. The service assurance agent can be configured to apply a particular resource allocation scheme for a particular VNF/application where the scheme specifies how the service assurance agent is to modify the resources allocated to the VNF/application based on the telemetry information indicated in one or more KPIs.

The service assurance agent can be granted privileges (e.g., roots of trust (RoT) or kernel level privileges) so that the service assurance agent can change resource settings to suit the needs of the VNF/application. To modify power, frequency, memory allocation, or cache settings of the core(s), service assurance agent can instruct the OS to perform those settings or with sufficient privilege, the service assurance agent can write to specific registers files to set operating parameters.

Figure 2:
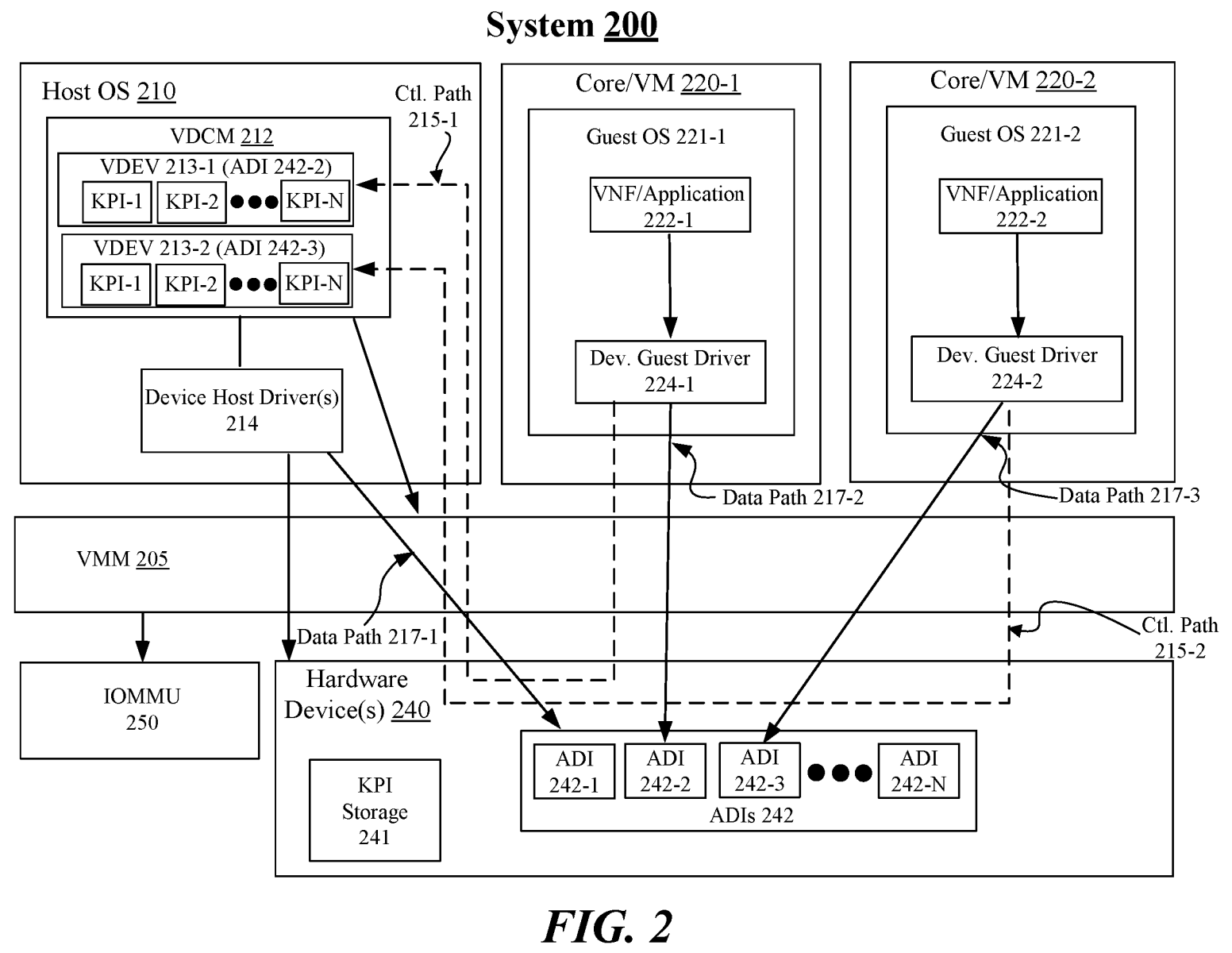

FIG. 2 illustrates an example system 200. In some examples, as shown in FIG. 2, system 200 includes a host operating system (OS) 210, a virtual machine (VM) 220-1, a VM 220-2, a virtual machine monitor (VMM) 205, one or more hardware device(s) 240 and an input-output memory management unit (IOMMU) 250. According to some examples, system 200 may be at least part of a host computing device (e.g., system 100 shown in FIG. 1) supported by one or more host CPUs and/or multi-core processors (e.g., processor(s) 102).

According to some examples, system 200 may depict an example of a virtualized software architecture via which hardware device(s) 240 are virtualized via a type of scalable I/O virtualization (S-IOV), such as described in the Intel® S-IOV specification. In some other examples, hardware device(s) 240 may also be virtualized via single-root I/O virtualization (SR-IOV) or discrete device assignment (e.g. PCIe passthrough). Examples are not limited to S-IOV or SR-IOV virtual execution environments for virtualization of hardware device(s) for use by VMs.

Virtualization of hardware device(s) 240 may be supported by a software component of host OS 210 shown in FIG. 2 as a virtual device composition module (VDCM 212), which composes virtual devices (VDEVs) of hardware device(s) 240 and exposes the VDEV to guest OS 221-1 and guest OS 221-2 executed by respective core/VMs 220-1 and 220-2. In some alternative examples, VM 220-1 or VM 220-2 may be executing a virtualized or machine container. In some examples, VDCM 212 may be a type of module specific to VMM 205 and may be responsible for communicating with VMM 205 to facilitate virtualization of hardware device(s) 240. Depending on a host computing device's specific software architecture, VDCM 212 may be developed as a user level module, as part of the kernel mode driver, as a separate kernel module, or as part of VMM 205.

In some example, one or more device host driver(s) 214 in host OS 210 may be extended to support VDCM 212 operations needed for virtualization of hardware device(s) 240. Similarly, device guest drivers 224-1 and 224-2 of guest OS 221-1 and guest OS 221-2 for respective core/VMs 220-1 and 220-2 are also extended to facilitate access to hardware device(s) 240 by VNF/application 222-1 and VNF/application 222-2. For these examples, device host driver(s) 214 control and manage hardware device(s) 240 and allow for sharing of hardware device(s) 240 among device guest drivers 224-1 and 224-2. In some examples, VNF/applications 222-1 and 222-2 are user-mode applications, kernel-mode applications, user-mode drivers, kernel-mode drivers, containers, or any combination of thereof.

According to some examples, VDEVs 213-1 and 213-2 may be implemented by VDCM 212 as shown in FIG. 2. For these examples, VDEVs 213-1 and 213-2 may enable VDCM 212 to emulate a same interface as a physical interface to hardware device(s) 240 so that hardware driver (s) can run in both host OS 210 and respective guest OS 221-1 and guest OS 221-2. For example, device guest drivers 224-1 and 224-2 may access respective VDEVs 213-1 and 213-2 through memory mapped I/O (MMIO) registers (not shown) using a same software interface as hardware device(s) 240. The MMIO registers may be arranged according to the S-IOV specification and may map to a memory space of system memory. VDCM 212 may emulate a behavior of hardware device(s) 240 and mediates guest subscription of hardware device(s) 240 through device host driver(s) 214. In some examples, as shown in FIG. 2, control paths 215-1 and 215-2 may be used for control path operations for respective VDEVs 213-1 and 213-2 from respective device guest drivers 224-1 and 224-2 of VMs 220-1 and 220-2. In some examples, as described more below, control paths such as control paths 215-1 and 215-2 may be utilized by VNFs/applications such as VNF/applications 222-1 and 222-2 to expose telemetry data included in KPIs included in VDEVs such as KPIs 1-N included in VDEVs 213-1 and 213-2 shown in FIG. 2. For these examples, "N" may represent any whole, positive number >2.

In some examples, fast path operations may be implemented via data paths 217-1 to 217-3 to submit work requests (descriptor submissions) to hardware device(s) 240 for execution by circuitry of the hardware device(s) 240 (not shown) through assignable device interfaces (ADIs) 242. For these examples, individual ADIs may represent a type of hardware device resource being used by VNF/application 222-1 or VNF/application 222-2. For example, if hardware device(s) 240 includes a network controller, an ADI may represent transmit/receive queues, e.g., associated with a virtual switch interface. If hardware device(s) 240 includes a storage controller, an ADI may represent command and completion queues, e.g., associated with a storage namespace. If hardware device(s) 240 includes a GPU, an ADI may represent a dynamically created graphics or compute context. If hardware device(s) 240 includes an FPGA accelerator, an ADI may represent an accelerator functional unit. If hardware device(s) includes a multi-context FPGA, an ADI may represent dynamically created execution context. If hardware device(s) includes a remote direct memory access (RDMA) device, an ADI may represent a queue pair. ADIs 242-1 to 242-N may be for a single hardware resource included in hardware device(s) 240 or may represent ADIs for combinations of hardware devices. For these examples, "N" as used in ADIs 242-1 to 242-N may represent any whole, positive number >3.

According to some examples, each ADI included in a VDEV of VDCM 212 may directly map resources of a hardware device included in hardware device(s) 240 to VNF/applications of a guest OS executed by a VM. For example, resources of a hardware device associated with ADI 242-2 may be directly mapped to core/VM 220-1 via VDEV 213-1 and resources of a hardware device associated with ADI 242-3 may be directly mapped to core/VM 220-2 via VDEV 213-2. This allows VNF/application 222-1 to send work requests to use the resources of the hardware device associated with ADI 242-2 and allows VNF/application 222-2 to send work requests to use the resources of the hardware device associated with ADI 242-3.

In some examples, VNF/application 222-1 and VNF/application 222-2 having mapped access to ADIs included in ADIs 242 are configured to use separately assigned process address space identifiers (PASIDs). For these examples, VMM 205 may allocate a default host PASID for a given VM and then configure a PASID table entry for that default host PASID in IOMMU 250 for a second level address translation (e.g., guest physical address to host physical address).

In examples where shared virtual memory is supported by guest OS 221-1 and 221-2, accelerator VDEVs 213-1 and 213-2 include support for PASID. For these examples, VMM 205 may expose a virtual IOMMU of IOMMU 250 to these guest OSs. Guest OS 221-1 and guest OS 221-2 may set up PASID table entries in this virtual IOMMU's PASID table. In some examples, VMM 205 may choose to use a para-virtualized or enlightened virtual IOMMU where guest OS 221-1 and guest OS 221-2 do not generate their own guest PASIDs but instead request guest PASIDs from the virtual IOMMU of IOMMU 250. These guest PASIDs may then be assigned to each VNF/application executed or supported by guest OS 221-1 and guest OS 221-2 to uniquely identify each VNF application via their respectively assigned PASIDs.

According to some examples, assigned PASIDs may be attached as metadata to KPIs written to VDEVs 213-1 or 213-2 by VNF/application 222-1 or 222-2 in order to uniquely identify a source of the KPI, e.g., to an orchestrator. In some examples, a KPI storage 241 may include memory located on hardware device(s) 240 to store KPIs that include PASIDs as metadata. KPI storage 241 may serve as a type of hardware mailbox to enable device guest driver 224-1 or 224-2 to write KPIs for their respective VNFs/applications and reduce overhead imposed on control paths 215-1 or 215-2 if KPIs were directly written to a memory space of VDEVs 213-1 or 213-2 at VDCM 212 via these control paths.

According to some examples, an example format or structure for a message used to convey a KPI from a device guest driver to a VDEV is shown below:

Example KDI Structure

```
struct KpiMsg {
    uint8 kpiNumber;
    uint64 kpiValue;
};
```

The example KDI structure would allow for 256 different KPIs as 8 bits may be used to identify a given KPI. Also, the example KDI structure indicates that a KPI value may be 64 bits in size (e.g., 2 double words).

Figure 3:
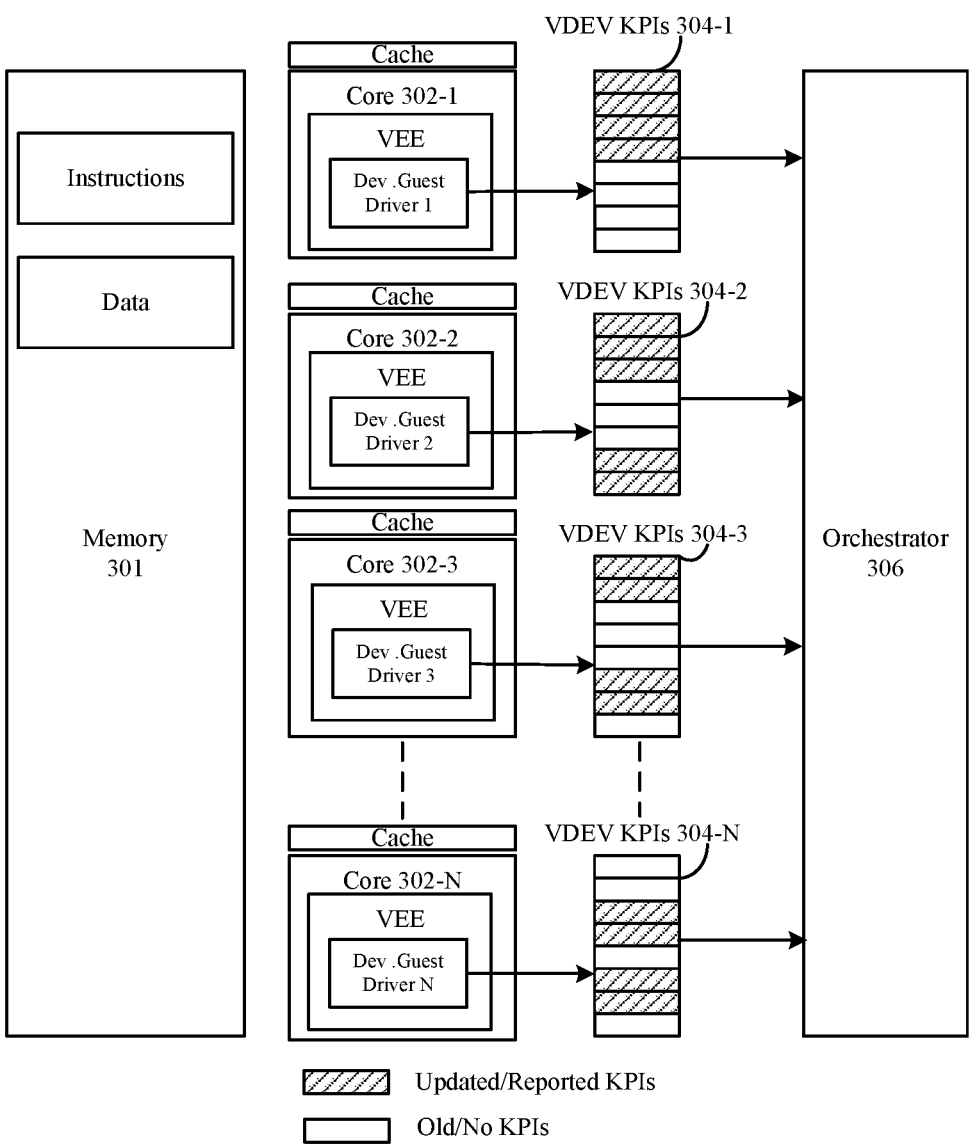
FIG. 3 illustrates an example scheme.

FIG. 3 illustrates an example scheme 300. According to some examples, scheme 300 may be used to share performance telemetry by writing the performance telemetry in the form of VDEV KPIs 304 so that a system or platform management entity such as an orchestrator 306 may configure/adjust resource allocations assigned to a VNF/application based on the performance telemetry values indicated in VDEV KPIs 304. Memory 301 can store instructions for execution in an application or application executed within a VEE by any of cores 302-1 to 302-N, where "N", as shown in FIG. 3, is an integer and greater than or equal to 4. A device guest driver for a VNF/application executing on cores 302-1 to 302-N may send KPIs to VDEV KPIs 304. In some examples, if a VNF/application is executed within a VEE, only a single instance of the VNF/application is executed within a VEE on a core. In other examples, multiple VNF/applications may be executed with a VEE on a single or same core.

According to some examples, as shown in FIG. 3, device guest drivers 1 to N for VNFs/applications running on cores 302-1 and 302-N may be configured to write application telemetry to respective VDEV KPIs among VDEV KPIs 304-1 to 304-N. For these examples, the patterned boxes for VDEV KPIs 304 indicate updated or reported KPIs to orchestrator 306 and clear boxes indicate old or no KPI values from among VDEV KPIs 304.

In some example, for DPDK or SPDK, libraries can be available to configure a device guest driver of a VNF/application to write telemetry information to VDEV KPIs or for an orchestrator (e.g., orchestrator 306) to read telemetry information from a memory that stores VDEV KPI (e.g., KPI storage 241 or a memory space mapped to MMIO registers for VDEV of a VDCM). A report telemetry application program interface (API) (e.g., written in C++) can be made available for a developer to use and a VNF/application compiler (e.g., compile-time or run-time) can generate a machine language version of the VNF/application configured to have a device guest driver write telemetry information to VDEV KPIs.

A device guest driver of a VNF/application may write application telemetry to one or more VDEV KPIs 304 based on a time interval or based on other triggers such as a per loop or per interval basis. If there is nothing to report for a specific telemetry component, then a "0" or some other specific value may be written to a VDEV KPI 304 and orchestrator 306 may identify there is no new or different telemetry information reported. In cases where no new or different telemetry information is reported, orchestrator 306 may elect to not perform any determination of whether to adjust resource allocations to cores or VNFs/applications and thereby save power or CPU cycles.

According to some examples, a VNF/application, workload, or software may perform packet processing based on one or more of DPDK, SPDK, OpenDataPlane, NFV, software-defined networking (SDN), Evolved Packet Core (EPC), or 5G network slicing. Some example implementations of NFV are described in European Telecommunications Standards Institute (ETSI) specifications or Open Source NFV Management and Orchestration (MANO) from ETSI's Open Source Mano (OSM) group. For these examples, a VNF may include a service chain or sequence of virtualized tasks executed on generic configurable hardware such as firewalls, domain name system (DNS), caching or network address translation (NAT) and can run in VEEs. VNFs can be linked together as a service chain. In some examples, EPC is a 3GPP-specified core architecture at least for Long Term Evolution (LTE) access. 5G network slicing can provide for multiplexing of virtualized and independent logical networks on the same physical network infrastructure. Some VNFs/applications can perform video processing or media transcoding (e.g., changing the encoding of audio, image or video files).

In some examples, orchestrator 306 may read particular VDEV KPIs associated with each VNF/application. For these examples, orchestrator 306 may periodically poll for updates to a particular VDEV KPI for one or more VNFs/applications.

According to some examples, orchestrator 306 may operate independent of a type of utilized operating system (OS). Orchestrator 306 may securely access VDEV KPIs that are not transferred over a network in a packet. Orchestrator 306 may operate on a same CPU or different CPU as that of any of the cores executing VNFs/applications associated with VDEV KPIs 304, the same server or different server as that of any of the cores executing VNFs/applications associated with VDEV KPIs 304, the same rack or different rack as that of any of the cores executing VNFs/applications associated with VDEV KPIs 304, the same row of racks or different row of racks as that of any of the cores executing VNFs/applications associated with VDEV KPIs 304, or the same data center or different data center as that of any of the cores executing VNFs/applications associated with VDEV KPIs 304.

In some examples, orchestrator 306 may utilize VNF/application telemetry to determine whether to affect changes to resource allocation to one or more VNFs/applications. For a VNF/application running on a core, changes may include changing cache allocation to the core, adjusting CPU frequency of the core, changing memory allocation to the core, changing network interface bandwidth allocated to the core, and so forth. Orchestrator 306 may be configured to correlate an VNF's/application's telemetry information to adjust resource allocation to improve performance or stability of the VNF/application or reduce power of the core and also gauge an impact of those changes to other VNFs/applications currently executing on other cores. For example, orchestrator 306 may move the VNF/application to a slower/less resource intensive CPU core because the VNF/application is not actively using an acceptable percentage (e.g., under 75%) of the core's resources.

According to some examples, orchestrator 306 may adjust core operating parameters by requesting an OS to adjust power or frequency allocated to a core. In some examples, orchestrator 306 may be granted privileges (e.g., roots of trust (RoT) or kernel level privileges) to change core frequency or cache allocation settings. Orchestrator 306 may modify power, frequency, cache settings of core(s) by writing to specific files to set values, and reading from other files to read the current settings.

In some examples, orchestrator 306 can utilize Intel® Resource Director Technology (Intel® RDT) to monitor and control how shared resources such as last-level cache (LLC) and memory bandwidth are used by VNFs/applications. Orchestrator 306 may utilize Cache Allocation Technology (CAT) or Speed Select Technology Base Frequency (SST-BF) to monitor and control how shared resources such as cache allocation (e.g., L-0, L-1, L-2, L-3 or LLC) or set core frequency. In some examples, orchestrator 306 may perform resource allocation that includes modifying server composition such as one or more of: adding or removing core, add or removing allocated addressable memory space, adding or removing an accelerator. In some examples, resources may be disaggregated and composed from resource allocation of devices in a same or different server, same or different rack, same or different row of racks, or same or different data center.

Figure 4:
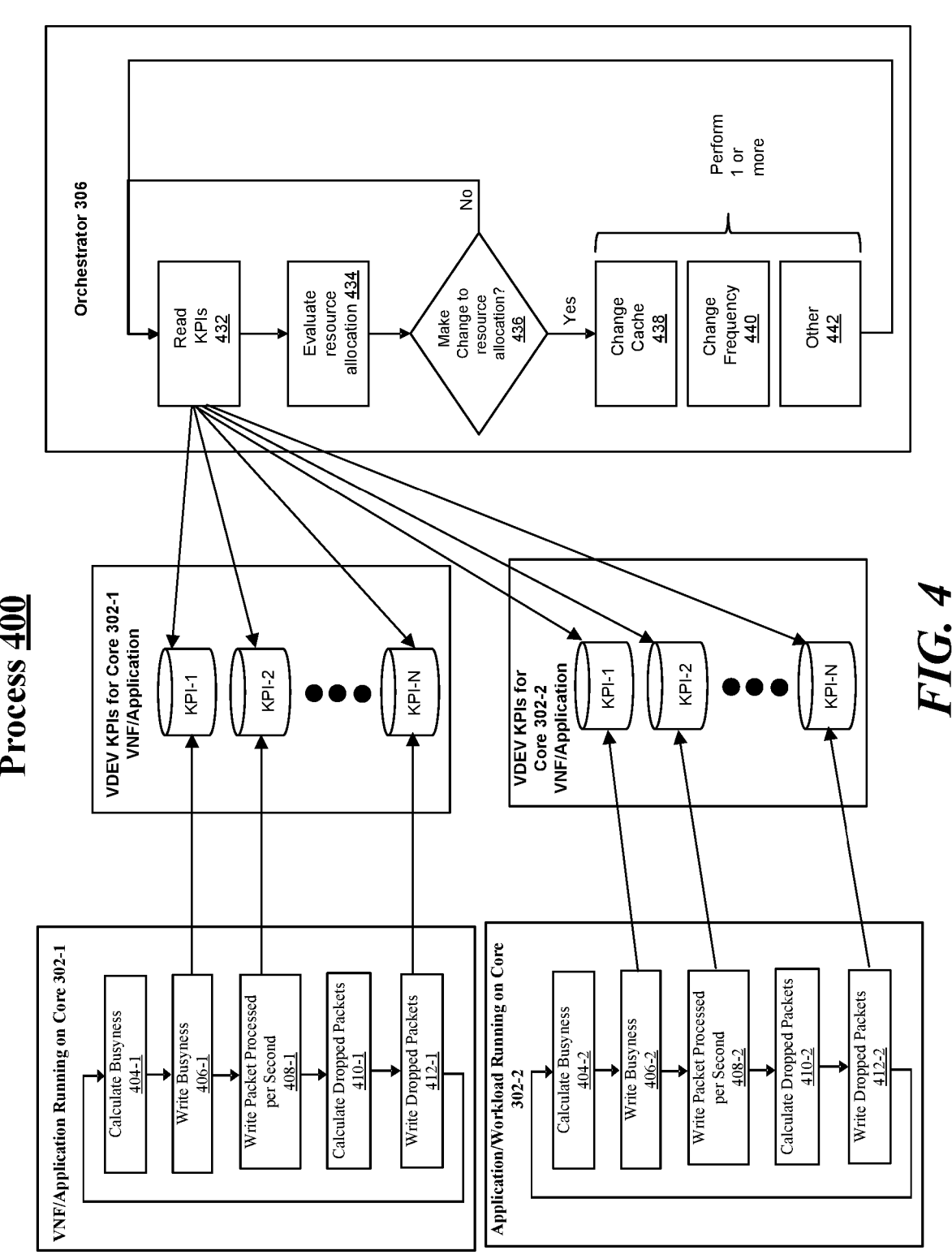
FIG. 4 illustrates an example process.

FIG. 4 illustrates an example process 400. In some examples, as shown in FIG. 4, a VNF/application running on core 302-1 and a VNF/application running on core 302-2 may separately determine, at 404-1/2, respective busyness levels. For example, busyness level can be determined within a range of 0-100, where level 0 indicates 0 processed packets since last reported KPI and level 100 indicates the VNF/application processed a packet on every loop in the poll mode driver. At 406-1/2, device guest drivers of each VNF/application may write a busyness level indicator to their respective VDEV KPI. For example, write busyness level indicator to VDEV KPI-1 as shown in FIG. 4 may include the busyness level indicator. At 408-1/2, device quest drivers of each VNF/application may write a number of packets processed per second to their respective VDEV KPI. For example, write the number of packets processed per second to VDEV KPI-2. At 410-1/2, each VNF/application may calculate a number of dropped packets (e.g., how many packets were dropped over the last interval). At 412-1/2, device guest drivers of each VNF/application may write the number of dropped packets to their respective VDEV KPI. For example write the number of dropped packets to VDEV KPI-N.

At 432, orchestrator 306 may read the VDEV KPIs to read telemetry data. At 434, orchestrator 306 may determine resource allocation to VNFs/applications running on cores 302-1/2. At 436, orchestrator 306 may determine whether to adjust resource allocations to the VNFs/applications running on cores 302-1/2 based on the telemetry data included/indicated in the read VDEV KPIs. In one example, if the telemetry data indicates that both VNFs/applications meet respective performance requirements, no changes in resource allocation takes place and the process can return to 432. In another example, if the telemetry data indicates that either core 302-1 or 302-2 are underutilized or unable to handle a workload executed by a respective VNF/application while meeting respective performance requirements, orchestrator 306 may proceed to 438, 440, and 442.

According to some examples, orchestrator 306 may be configured to perform one or more of 438, 440, and 442 to reduce resources to cores executing VNFs/applications or provide additional resources to cores executing VNFs/applications. For example, 438 may include increasing or decreasing cache allocation (e.g., L-0, L-1, L-2, LLC) to the core executing a respective VNF/application. For example, 440 may include increasing or decreasing frequency of operation of core 302-1 and/or core 302-2. For example, 442 can include increasing or decreasing memory or bandwidth allocation to the core 302-1 and/or core 302-2. Other resource allocation changes may be made such as changes to server composition (e.g., changing locally accessible resources of a server or fabric or network accessible resources of a server).

FIG. 5 depicts an example flow 500. At 502, VNFs/applications determine and device guest drivers write KPI/telemetry data to KPI storage associated with a respective VDEV. In some examples, the KPI storage may be located on a hardware device via which the VNFs/applications executed by one or more cores are able to use the hardware device via hardware virtualization according to the S-IOV specification. In other examples, the KPI storage may be a memory space of a system memory that is mapped via MMIO registers for respective VDEVs for the device guest drivers of the VNFs/applications, the VDEVs established according to the S-IOV specification.

At 504, an orchestrator may read telemetry data from the KPI storage for platform VNFs/Applications. Specific types of telemetry data (e.g., busyness, packet drops per unit of time, packets processed per unit of time, and so forth) may be attributed to a VNF/application based on metadata attached to a given KPI (e.g., a PASID). For example, for SPDK-based workloads executed by a core, telemetry data may specify one or more of: writes per second, read per second, or number of pending writes. At 506, the orchestrator may determine whether to adjust resource allocations for VNFs/applications. For example, the orchestrator may determine to adjust resource allocations based on respective performance requirements for one or more of the VNFs/applications and a particular resource adjustment scheme for the one or more VNFs/applications. For example, if a respective performance requirement is violated, resource allocations may be adjusted according to the resource adjustment scheme. For example, if respective performance requirements are not violated, resource allocations may be maintained or may be adjusted to reduce power use according to the resource adjustment scheme. If resource allocations are not to be adjusted, the process can return to 504. If resource allocations are to be adjusted, the process can continue to 508.

At 508, the orchestrator may adjust resource allocations to one or more of the VNFs/applications. For example, if at least one performance requirement is violated for a VNF/application, according to a resource adjustment scheme for the VNF/application, the orchestrator may perform one or more of: increase frequency of the core executing the VNF/application, increase of cache allocation, increase of memory allocation, increase of network interface bandwidth for the VNF/application, or adjust a composition of a server (e.g., adjust disaggregated resources allocated to the server). For example, if no performance requirements are violated, according to respective resource adjustment schemes for the VNFs/applications, the orchestrator may perform one or more of: decrease frequency of at some of the cores executing the VNFs/applications, decrease of cache allocations to at least some of the cores executing the VNFs/applications, decrease of memory allocation to at least some of the VNFs/applications, or decrease of network interface bandwidth for at least some of the VNFs/applications. In some examples, the orchestrator may cause migration of one or more of the VNFs/applications to another core and cause the former core to sleep according to respective resource adjustment schemes for the migrated VNFs/applications.

Figure 6:
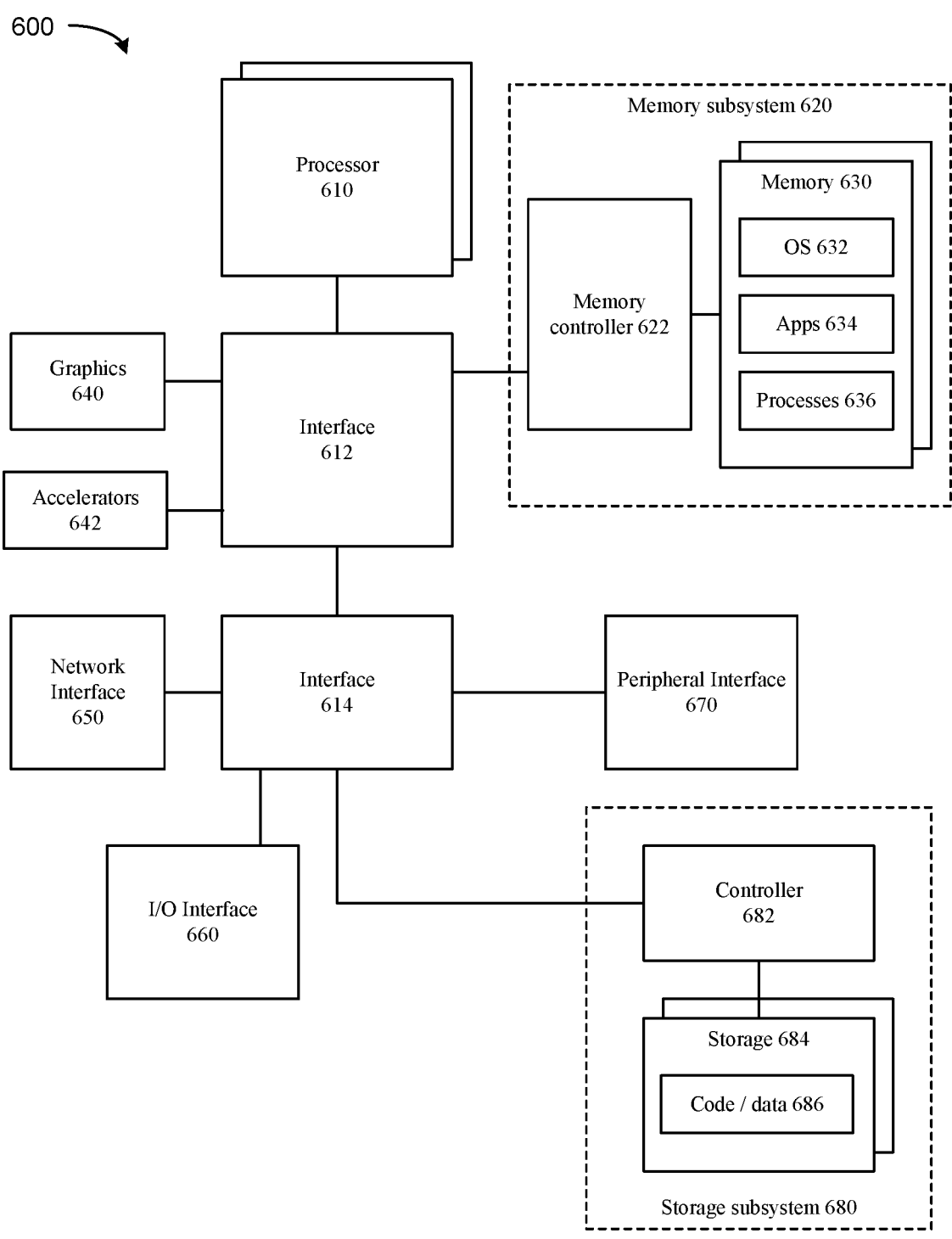
FIG. 6 illustrates an example third system.

FIG. 6 illustrates an example system 600. In some examples, system 600 use examples described herein to convey VNF/application telemetry data and adjust resource allocations according to respective VNF/application resource adjustment scheme(s). System 600 includes processor 610, which provides processing, operation management, and execution of instructions for system 600. Processor 610 may include any type of microprocessor, central processing unit (CPU), graphics processing unit (GPU), processing core, or other processing hardware to provide processing for system 600, or a combination of processors. Processor 610 controls the overall operation of system 600, and may be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 600 includes interface 612 coupled to processor 610, which may represent a higher speed interface or a high throughput interface for system components that needs higher bandwidth connections, such as memory subsystem 620 or graphics interface components 640, or accelerators 642. Interface 612 represents an interface circuit, which may be a standalone component or integrated onto a processor die. Where present, graphics interface 640 interfaces to graphics components for providing a visual display to a user of system 600. In one example, graphics interface 640 may drive a high definition (HD) display that provides an output to a user. High definition may refer to a display having a pixel density of approximately 100 PPI (pixels per inch) or greater and can include formats such as full HD (e.g., 1080p), retina displays, 4K (ultra-high definition or UHD), or others. In one example, the display may include a touchscreen display. In one example, graphics interface 640 generates a display based on data stored in memory 630 or based on operations executed by processor 610 or both. In one example, graphics interface 640 generates a display based on data stored in memory 630 or based on operations executed by processor 610 or both.

Accelerators 642 may be a programmable or fixed function offload engine that can be accessed or used by a processor 610. For example, an accelerator among accelerators 642 may provide compression (DC) capability, cryptography services such as public key encryption (PKE), cipher, hash/authentication capabilities, decryption, or other capabilities or services. In some examples, in addition or alternatively, an accelerator among accelerators 642 provides field select controller capabilities as described herein. In some cases, accelerators 642 may be integrated into a CPU socket (e.g., a connector to a motherboard or circuit board that includes a CPU and provides an electrical interface with the CPU). For example, accelerators 642 may include a single or multi-core processor, graphics processing unit, logical execution unit single or multi-level cache, functional units usable to independently execute programs or threads, ASICs, neural network processors (NNPs), programmable control logic, and programmable processing elements such as FPGAs. Accelerators 642 may provide multiple neural networks, CPUs, processor cores, general purpose graphics processing units, or graphics processing units can be made available for use by artificial intelligence (AI) or machine learning (ML) models. For example, the AI model may use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

According to some examples, accelerators 642 may include an infrastructure processing unit (IPU) or data processing unit (DPU) or may be utilized by an IPU or DPU. An xPU may refer at least to an IPU, DPU, graphic processing unit (GPU), general-purpose GPU (GPGPU). An IPU or DPU may include a network interface with one or more programmable or fixed function processors to perform offload of operations that could have been performed by a CPU (e.g., processor 610). The IPU or DPU may include one or more memory devices (not shown). In some examples, the IPU or DPU may perform virtual switch operations, manage storage transactions (e.g., compression, cryptography, virtualization), and manage operations performed on other IPUs, DPUs, servers, or devices.

Memory subsystem 620 represents the main memory of system 600 and provides storage for code to be executed by processor 610, or data values to be used in executing a routine. Memory subsystem 620 may include one or more memory devices 630 such as read-only memory (ROM), flash memory, one or more varieties of random access memory (RAM) such as DRAM, or other memory devices, or a combination of such devices. Memory 630 stores and hosts, among other things, operating system (OS) 632 to provide a software platform for execution of instructions in system 600. Additionally, applications 634 may execute on the software platform of OS 632 from memory 630. Applications 634 represent programs that have their own operational logic to perform execution of one or more functions. Processes 636 represent agents or routines that provide auxiliary functions to OS 632 or one or more applications 634 or a combination. OS 632, applications 634, and processes 636 provide software logic to provide functions for system 600. In one example, memory subsystem 620 includes memory controller 622, which is a memory controller to generate and issue commands to memory 630. It will be understood that memory controller 622 could be a physical part of processor 610 or a physical part of interface 612. For example, memory controller 622 may be an integrated memory controller, integrated onto a circuit with processor 610.

While not specifically illustrated, it will be understood that system 600 may include one or more buses or bus systems between devices, such as a memory bus, a graphics bus, interface buses, or others. Buses or other signal lines may communicatively or electrically couple components together, or both communicatively and electrically couple the components. Buses may include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 600 includes interface 614, which may be coupled to interface 612. In one example, interface 614 represents an interface circuit, which may include standalone components and integrated circuitry. In one example, multiple user interface components or peripheral components, or both, couple to interface 614. Network interface 650 provides system 600 the ability to communicate with remote devices (e.g., servers or other computing devices) over one or more networks. Network interface 650 may include an Ethernet adapter, wireless interconnection components, cellular network interconnection components, USB (universal serial bus), or other wired or wireless standards-based or proprietary interfaces. Network interface 650 may transmit data to a device that is in the same data center or rack or a remote device, which may include sending data stored in memory. Network interface 650 may receive data from a remote device, which may include storing received data into memory. Various examples may be used in connection with network interface 650, processor 610, and memory subsystem 620.

In one example, system 600 includes one or more I/O interface(s) 660. I/O interface(s) 660 may include one or more interface components through which a user interacts with system 600 (e.g., audio, alphanumeric, tactile/touch, or other interfacing). Peripheral interface 670 may include any hardware interface not specifically mentioned above. Peripherals refer generally to devices that connect dependently to system 600. A dependent connection is one where system 600 provides the software platform or hardware platform or both on which operation executes, and with which a user interacts.

In one example, system 600 includes storage subsystem 680 to store data in a nonvolatile manner. In one example, in certain system implementations, at least certain components of storage 680 may overlap with components of memory subsystem 620. Storage subsystem 680 includes storage device(s) 684, which may be or may include any conventional medium for storing large amounts of data in a nonvolatile manner, such as one or more magnetic, solid state, or optical based disks, or a combination. Storage 684 holds code or instructions and data 686 in a persistent state (e.g., the value is retained despite interruption of power to system 600). Storage 684 may be generically considered to be a "memory," although memory 630 is typically the executing or operating memory to provide instructions to processor 610. Whereas storage 684 is nonvolatile, memory 630 may include volatile memory (e.g., the value or state of the data is indeterminate if power is interrupted to system 600). In one example, storage subsystem 680 includes controller 682 to interface with storage 684. In one example controller 682 is a physical part of interface 614 or processor 610 or can include circuits or logic in both processor 610 and interface 614.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). Another example of volatile memory includes cache or static random access memory (SRAM). A memory subsystem as described herein may be compatible with a number of memory technologies, such as such as DDR3 (DDR version 3), originally released by JEDEC (Joint Electronic Device Engineering Council) on Jun. 27, 2007, DDR4 (DDR version 4), originally published in September 2012, DDR5 (DDR version 5), originally published in July 2020, LPDDR3 (Low Power DDR version 3), JESD209-3B, originally published in August 2013, LPDDR4 (LPDDR version 4), JESD209-4, originally published in August 2014, LPDDR5 (LPDDR version 5, JESD209-5A, originally published by in January 2020), WIO2 (Wide Input/output version 2), JESD229-2 originally published in August 2014, HBM (High Bandwidth Memory), JESD235, originally published in October 2013, HBM2 (HBM version 2), JESD235C, originally published in January 2020, or HBM3, JESD238, originally published in January 2022, or others or combinations of memory technologies, and technologies based on derivatives or extensions of such specifications. The JEDEC standards or specifications are available at www.jedec.org.

A non-volatile memory (NVM) device is a memory whose state is determinate even if power is interrupted to the device. In some examples, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device may also comprise a byte-addressable, write-in-place, three dimensional cross point memory device, or other byte addressable, write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 600. More specifically, power source typically interfaces to one or multiple power supplies in system 600 to provide power to the components of system 600. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source may include an internal battery, alternating current supply, motion-based power supply, solar power supply, or fuel cell source.

In an example, system 600 can be implemented using interconnected compute sleds of processors, memories, storages, network interfaces, and other components. High speed interconnects may be used such as PCIe, Ethernet, or optical interconnects (or a combination thereof).

Figure 7:
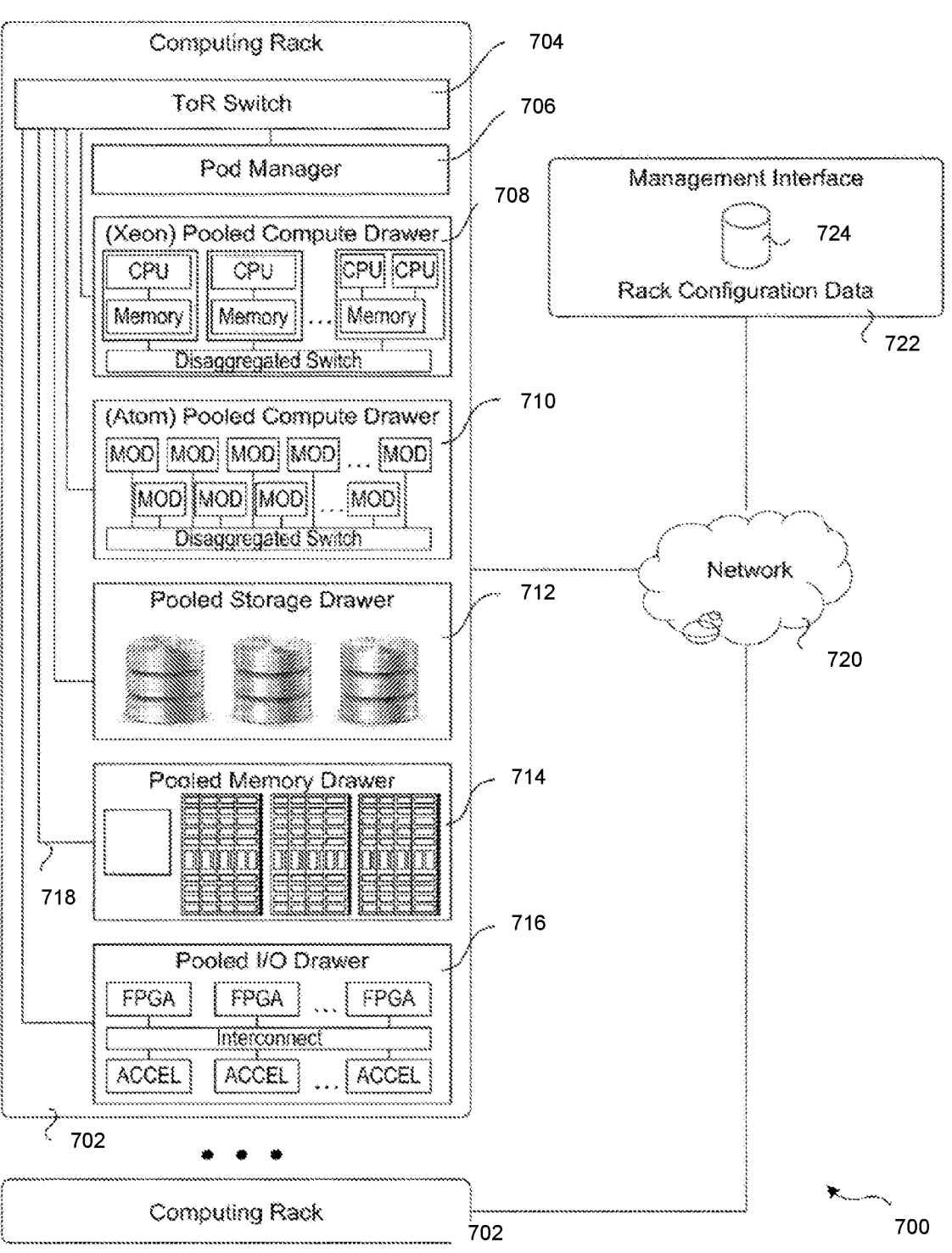
FIG. 7 illustrates an example environment.

FIG. 7 illustrates an example environment 700. In some examples, as shown in FIG. 7, environment 700 includes multiple computing racks 702, each including a Top of Rack (ToR) switch 704, a pod manager 706, and a plurality of pooled system drawers. For these examples, environment 700 may use examples described herein to convey VNF/application telemetry data and adjust resource allocations according to respective VNF/application resource adjustment scheme(s). Generally, the pooled system drawers may include pooled compute drawers and pooled storage drawers. Optionally, the pooled system drawers may also include pooled memory drawers and pooled I/O drawers. In some examples, pooled system drawers may include an Intel® XEON® pooled computer drawer 708, and Intel® ATOM™ pooled compute drawer 710, a pooled storage drawer 712, a pooled memory drawer 714, and a pooled I/O drawer 716. Each of the pooled system drawers may be connected to ToR switch 704 via a high-speed link 718, such as a 40 Gigabit/second (Gb/s) or 100 Gb/s Ethernet link or a 100+Gb/s Silicon Photonics (SiPh) optical link. In some examples, high-speed link 718 comprises an 800 Gb/s SiPh optical link.

Multiple of the computing racks 702 may be interconnected via their ToR switches 704 (e.g., to a pod-level switch or data center switch), as illustrated by connections to a network 720. In some examples, groups of computing racks 702 are managed as separate pods via pod manager(s) 706. In some examples, a single pod manager is used to manage all of the racks in the pod. Alternatively, distributed pod managers may be used for pod management operations.

Environment 700 further includes a management interface 722 that is used to manage various aspects of the environment. This includes managing rack configuration, with corresponding parameters stored as rack configuration data 724. Environment 700 can be used for computing racks.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," or "logic." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An example of the devices, systems, and methods may include any one or more, and any combination of, the examples described below.

Flow diagrams as illustrated herein provide examples of sequences of various process actions. The flow diagrams may indicate operations to be executed by a software or firmware routine, as well as physical operations. In some embodiments, a flow diagram may illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

Various components described herein can be a means for performing the operations or functions described. Each component described herein includes software, hardware, or a combination of these. The components can be implemented as software modules, hardware modules, special-purpose hardware (e.g., application specific hardware, ASICs, DSPs, etc.), embedded controllers, hardwired circuitry, and so forth.

The following examples pertain to additional examples of technologies disclosed herein.

Example 1. An example method may include a plurality of applications executing within a virtual execution environment, the applications configured to write telemetry data to a memory associated with respective virtual devices of a hardware device. The hardware device may be used by the applications to separately support individual virtual network functions. The telemetry data may include performance measurements of the applications. The method may also include an orchestrator reading the telemetry data from the memory associated with the respective virtual devices of the hardware device. The method may also include the orchestrator selectively causing modification of at least one resource allocation to the applications based on the read telemetry data.

Example 2. The method of example 1, the telemetry data may indicate individual utilizations of respective cores executing the applications. For this example, a core having a utilization rate of 100%, as indicated by a performance measurement included in telemetry data, indicates a level of busyness of an application executed by the core.

Example 3. The method of example 1, the performance measurements included in telemetry data may include one or more of: application busyness level, packets processed over a time interval, number of packets dropped over a time interval, number of video frames processed over a time interval, writes per second, reads per second, or number of pending writes.

Example 4. The method of example 1, wherein the orchestrator may be a trusted entity and is permitted to read contents of the memory associated with the respective virtual devices of the hardware device.

Example 5. The method of example 1, wherein the orchestrator may apply a decision scheme to modify resource allocations for at least one of the applications based on performance measurements included in the telemetry data. For this example, the resource allocations may be one or more of: processor frequency, cache allocation, memory allocation, network interface bandwidth allocation, or server composition.

Example 6. The method of example 5, the orchestrator may be configured to apply a particular decision scheme for a particular application. For this example, the decision scheme for one application may be different than a decision scheme applied for another application.

Example 7. The method of example 1, the hardware device used by the applications to separately support individual virtual network functions may be a network controller, a storage controller, a graphics processing unit, or a field programmable gate array accelerator.

Example 8. The method of example 1, virtual devices of the hardware device may be arranged according to a S-IOV specification.

Example 9. The method of example 8, the memory associated with respective virtual devices of the hardware device may be a memory space of a system memory that is mapped via MMIO registers according to the S-IOV specification.

Example 10. The method of example 1, the memory associated with respective virtual devices of the hardware device may be a memory located at the hardware device.

Example 11. An example at least one non-transitory computer-readable medium may include instructions stored thereon, that if executed by a system, may cause the system to write telemetry data for a plurality of applications executing within a virtual execution environment to a memory associated with respective virtual devices of a hardware device. The hardware device may be used by the applications to separately support individual virtual network functions, the telemetry data to include performance measurements of the applications. The instructions may also cause the system to cause an orchestrator for the system to read the telemetry data from the memory associated with the respective virtual devices of the hardware device. The instructions may also cause the system to cause the orchestrator to selectively modify at least one resource allocation to the applications based on the read telemetry data.

Example 12. The at least one non-transitory computer-readable medium of example 11, the telemetry data may indicate individual utilizations of respective cores executing the applications. A core that has a utilization rate of 100%, as indicated by a performance measurement included in telemetry data, indicates a level of busyness of an application executed by the core.

Example 13. The at least one non-transitory computer-readable medium of example 11, the performance measurements included in telemetry data may be one or more of: application busyness level, packets processed over a time interval, number of packets dropped over a time interval, number of video frames processed over a time interval, writes per second, reads per second, or number of pending writes.

Example 14. The at least one non-transitory computer-readable medium of example 11, the orchestrator may be a trusted entity and is permitted to read contents of the memory associated with the respective virtual devices of the hardware device.

Example 15. The at least one non-transitory computer-readable medium of example 11, the orchestrator may apply a decision scheme to modify resource allocations for at least one of the applications based on performance measurements included in the telemetry data, wherein the resource allocations comprises one or more of: processor frequency, cache allocation, memory allocation, network interface bandwidth allocation, or server composition.

Example 16. The at least one non-transitory computer-readable medium of example 15, the orchestrator may be configured to apply a particular decision scheme for a particular application. For this example, the decision scheme for one application may be different than a decision scheme applied for another application.

Example 17. The at least one non-transitory computer-readable medium of example 11, the hardware device used by the applications to separately support individual virtual network functions may be a network controller, a storage controller, a graphics processing unit, or a field programmable gate array accelerator.

Example 18. The at least one non-transitory computer-readable medium of example 11, virtual devices of the hardware device may be arranged according to a S-IOV specification.

Example 19. The at least one non-transitory computer-readable medium of example 18, the memory associated with respective virtual devices of the hardware device may be a memory space of a system memory that is mapped via MMIO registers according to the S-IOV specification.

Example 20. The at least one non-transitory computer-readable medium of example 11, the memory associated with respective virtual devices of the hardware device may be a memory located at the hardware device.

Example 21. An example apparatus may include a first application to be executed within a virtual execution environment by a core of a processor. The apparatus may also include a second application to be executed within the virtual execution environment by a core of the processor, wherein the first application and the second application are configured to write telemetry data to a memory associated with respective virtual devices of a hardware device. The hardware device may be used by the first application and the second application to separately support individual virtual network functions. The telemetry data may include performance measurements of the first application and the second application.

Example 22. The apparatus of example 21, the processor included in a platform that includes platform resources and an orchestrator to manage the platform resources allocated to the first application or the second application, wherein the orchestrator is to read the telemetry data from the memory associated with the respective virtual devices of the hardware device and selectively cause modification to at least one resource allocation to the first application or the second application.

Example 23. The apparatus of example 22, the orchestrator may be a trusted entity and is permitted to read contents of the memory associated with the respective virtual devices of the hardware device.

Example 24. The apparatus of example 22, the orchestrator may apply a decision scheme to modify resource allocations for at least one of the first application or the second application based on performance measurements included in the telemetry data. For this example, the resource allocations comprises one or more of: processor frequency, cache allocation, memory allocation, network interface bandwidth allocation, or server composition.

Example 25. The apparatus of example 24, the orchestrator may be configured to apply a first decision scheme for the first application and a second decision scheme for the second application that is different than the first decision scheme.

Example 26. The apparatus of example 21, a first core of the processor may execute the first application and a separate, second core of the processor may execute the second application.

Example 27. The apparatus of example 21, the telemetry data may indicate individual utilizations of the first and second cores. For this example, a utilization rate of 100%, as indicated by a performance measurement included in the telemetry data, may indicate a level of busyness of the first application or the second application.

Example 28. The apparatus of example 21, the performance measurements included in telemetry data may include one or more of: application busyness level, packets processed over a time interval, number of packets dropped over a time interval, number of video frames processed over a time interval, writes per second, reads per second, or number of pending writes.

Example 29. The apparatus of example 21, the hardware device used by the first application and the second application to separately support individual virtual network functions may be a network controller, a storage controller, a graphics processing unit, or a field programmable gate array accelerator.

Example 30. The apparatus of example 21, virtual devices of the hardware device may be arranged according to a S-IOV specification.

Example 31. The apparatus of example 30, the memory associated with respective virtual devices of the hardware device may be a memory space of a system memory that is mapped via MMIO registers according to the S-IOV specification.

Example 32. The apparatus of example 21, the memory associated with respective virtual devices of the hardware device may be a memory located at the hardware device.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first, " "second," "third," and so forth, are used merely as labels, and are not intended to impose numerical requirements on their objects.

What is claimed is:

1. An apparatus comprising:
a memory; and
circuitry to execute a virtual device (VDEV) of a hardware device, the VDEV used by a virtual network function (VNF) in a virtual execution environment, wherein the circuitry is configured to:
receive telemetry data from the VNF;
cause the telemetry data to be written to a portion of the memory associated with the VDEV, the telemetry data to include performance measurements of the VNF;
enable an orchestrator to read the telemetry data from the portion of the memory associated with the VDEV; and
cause a modification to at least one resource allocation to the VNF responsive to the orchestrator selectively causing the modification of the at least one resource allocation to the VNF based on the telemetry data read by the orchestrator.

2. The apparatus of claim 1, wherein the orchestrator comprises a trusted entity, and wherein the orchestrator is permitted to read contents from the portion of the memory associated with the VDEV.

3. The apparatus of claim 1, wherein the orchestrator is to apply a decision scheme to modify resource allocations for the VNF based on performance measurements included in the telemetry data, and wherein the resource allocations comprises one or more of: processor frequency, cache allocation, memory allocation, network interface bandwidth allocation, or server composition.

4. The apparatus of claim 1, wherein the circuitry comprises one or more cores of a processor.

5. The apparatus of claim 1, wherein the performance measurements included in the telemetry data comprise one or more of: a busyness level, packets processed over a time interval, number of packets dropped over a time interval, number of video frames processed over a time interval, writes per second, reads per second, or number of pending writes.

6. The apparatus of claim 1, wherein the hardware device comprises a network controller, a storage controller, a graphics processing unit, or a field programmable gate array accelerator.

7. The apparatus of claim 1, wherein the VDEV of the hardware device is arranged according to a scalable input/output virtualization (S-IOV) specification.

8. The apparatus of claim 7, wherein the portion of the memory associated with the VDEV of the hardware device comprises a memory space of the memory that is mapped to the portion of the memory via one or more memory mapped input/output (MMIO) registers according to the S-IOV specification.

9. The apparatus of claim 1, wherein the memory is located at the hardware device.

10. A method comprising:

executing a virtual device (VDEV) of a hardware device, the VDEV used by a virtual network function (VNF) in a virtual execution environment;

receiving telemetry data from the VNF;

writing the telemetry data to a portion of a memory, the portion associated with the VDEV, the telemetry data to include performance measurements of the VNF;

enabling an orchestrator to read the telemetry data from the portion of the memory associated with the VDEV; and causing a modification to at least one resource allocation to the VNF responsive to the orchestrator selectively causing the modification of the at least one resource allocation to the VNF based on the telemetry data read by the orchestrator.

11. The method of claim 10, wherein the performance measurements included in the telemetry data comprise one or more of: a busyness level, packets processed over a time interval, number of packets dropped over a time interval, number of video frames processed over a time interval, writes per second, reads per second, or number of pending writes.

12. The method of claim 10, wherein the orchestrator comprises a trusted entity, and wherein the orchestrator is permitted to read contents of the portion of the memory associated with the VDEV.

13. The method of claim 10, wherein the orchestrator is to apply a decision scheme to cause the modification to the at least one resource allocation to the VNF based on performance measurements included in the telemetry data, and wherein the at least one resource allocation comprises one or more of: processor frequency, cache allocation, memory allocation, network interface bandwidth allocation, or server composition.

14. The method of claim 10, wherein the VDEV of the hardware device is arranged according to a scalable input/output virtualization (S-IOV) specification.

15. At least one non-transitory computer-readable medium comprising instructions stored thereon, that if executed by a system, cause the system to:

execute a virtual device (VDEV) of a hardware device, the VDEV used by a virtual network function (VNF) in a virtual execution environment;

receive telemetry data from the VNF;

write the telemetry data to a portion of a memory, the portion associated with the VDEV, the telemetry data to include performance measurements of the VNF;

enable an orchestrator for the system to read the telemetry data from the portion of the memory associated with the VDEV; and cause a modification to at least one resource allocation to the VNF responsive to the orchestrator selectively causing the modification of the at least one resource allocation to the VNF based on the telemetry data read by the orchestrator.

16. The at least one non-transitory computer-readable medium of claim 15, wherein the performance measurements included in the telemetry data comprise one or more of: a busyness level, packets processed over a time interval, number of packets dropped over a time interval, number of video frames processed over a time interval, writes per second, reads per second, or number of pending writes.

17. The at least one non-transitory computer-readable medium of claim 15, wherein the orchestrator comprises a trusted entity, and wherein the orchestrator is permitted to read contents of the portion of the memory associated with the VDEV.

18. The at least one non-transitory computer-readable medium of claim 15, and wherein the orchestrator is to apply a decision scheme to cause the modification to the at least one resource allocation to the VNF based on performance measurements included in the telemetry data, wherein the at least one resource allocation comprises one or more of: processor frequency, cache allocation, memory allocation, network interface bandwidth allocation, or server composition.

19. The at least one non-transitory computer-readable medium of claim 15, the VDEV of the hardware device is arranged according to a scalable input/output virtualization (S-IOV) specification.

20. The at least one non-transitory computer-readable medium of claim 19, wherein the portion of the memory associated with the VDEV of the hardware device comprises a memory space of the memory that is mapped to the portion of the memory via one or more memory mapped input/output (MMIO) registers according to the S-IOV specification.

21. The at least one non-transitory computer-readable medium of claim 15, wherein the memory located at the hardware device.

\* \* \* \* \*